(12) United States Patent
Fukuchi

(10) Patent No.: US 6,181,899 B1
(45) Date of Patent: Jan. 30, 2001

(54) VIBRATION REDUCING PLASTIC GEAR

(75) Inventor: Yutaka Fukuchi, Yokohama (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/221,877

(22) Filed: Dec. 29, 1998

(30) Foreign Application Priority Data

Dec. 29, 1997 (JP) .................................................... 9-368853

(51) Int. Cl.⁷ ...................................................... G03G 15/00
(52) U.S. Cl. ......................... 399/117; 74/431; 74/DIG. 10
(58) Field of Search .............................. 74/434, 431, 446, 74/DIG. 10; 399/117, 167

(56) References Cited

U.S. PATENT DOCUMENTS 6,000,295 * 12/1999 Kimizuka ................................ 74/434

FOREIGN PATENT DOCUMENTS

| 08 006 437 | 1/1996 | (JP) . |
| 09 230 657 | 9/1997 | (JP) . |

* cited by examiner

*Primary Examiner*—Quana M. Grainger
(74) *Attorney, Agent, or Firm*—Oblon, Spivak, McClelland, Maier & Neustadt, P.C.

(57) ABSTRACT

A plastic gear includes a hub disposed at a core portion, a gear ring disposed concentrically outside of the hub and having a plurality of teeth on an outer surface thereof, and a web that connects the hub and the gear ring. A plurality of ribs is formed on front and rear side surfaces of the web at a prescribed constant angular interval and each of the plurality of the ribs is located substantially at a middle angular position between a pair of neighboring ribs formed on the front side surface.

10 Claims, 9 Drawing Sheets

VIBRATION REDUCING PLASTIC GEAR

BACKGROUND OF THE INVENTION

1. Field of the Invention

This invention relates to a gear made of plastic (hereinafter referred to as a plastic gear), which includes a ring-like hub forming a core portion, a concentric gear ring which has a larger diameter than that of the hub, on an outer surface of which gear teeth are arranged, and a plate-like web which connects the hub with the gear ring in a body. In particular, relates to a plastic gear having high productivity and capable of avoiding a vibration in a transmission device.

2. Discussion of the Background Art

It is well known in a transmission apparatus to have at least one plastic gear which transmits a rotation force of a driving motor to a driven member. For example, in an image forming apparatus such as a copier, a printer, a facsimile or a multi-functioned machine having a plurality of functions, a rotation force of a driving motor is generally transmitted to an image carrier through a driven member contacting the surface of the image carrier or the like for forming a toner image on the surface of the image carrier during its rotation. The conventional plastic gear may also be used in a duplicator, a camera, a video deck or a compact disk player and so on to transmit a rotational force to a driven member thereof.

In recent years, such plastic gears have tended to be rotated at higher speeds and so have been subjected to higher external forces. Since the conventional plastic gear is simply constituted by a hub, a gear ring and a web connecting the hub with the gear ring, it has been difficult to meet the necessary level of rigidity and strength required for the plastic gear. It is of course possible to increase both the rigidity and the strength to meet the prescribed level if both a thickness and a size of the gear are increased. However, this is costly and the transmission apparatus unavoidably becomes bulky.

To increase the rigidity, a plurality of ribs may be symmetrically mounted on both front and rear surfaces of the web in a body in a manner such that one edge connects to the hub and another edge connects to the gear ring. However, the diameter of such a plastic gear generally varies during its molding process due to the so called a shrink phenomenon of the plastic. As a result, a peripheral speed of the plastic gear periodically changes when it rotates, and accordingly, unevenness of the rotational speed of the driven member may arise.

The present inventor has determined that the shrink phenomenon occurs for the reason hereinbelow explained in detail referring to FIGS. 10 through 12. A conventional plastic gear 14 includes a cylindrical hub 25 disposed as a core portion and supported by the shaft 15 illustrated in FIG. 2. The plastic gear 14 further includes a gear ring 27 which is substantially concentric with the hub 25, has a larger diameter than the hub 25, and is disposed outside of the hub 25.

The gear ring 27 includes a plurality of gear teeth 26 on an outer circumferential surface thereof. The plastic gear 14 further includes a circular plate-like web 28 which connects the hub 24 with the gear ring 27 to form a single body. A plurality of ribs 29A and 29B are integrally formed respectively on a front side and a rear side of the web 28. Each of the ribs extends radially from the hub 25 to the gear ring 27.

The ribs 29A formed on a front surface of the web 28 are arranged at a prescribed angular interval around the hub 25. The ribs 29B formed on a rear surface of the web 28 are arranged in a same way as the ribs 29A. The ribs 29A and 29B are disposed at the same angular positions on the front and rear surfaces of the web 28. As a result, a perpendicular cross section of the web 28 intersects the cross sections of both the ribs 29A and 29B, as illustrated in FIG. 7. Since a partial shrink phenomenon occurs at each of portions of the plastic gear 14 where the ribs 28A and 29B are symmetrically formed on the front and rear side surfaces of the web 28 during a cooling process of molding, diameters of these portions decrease to be less than that of other portions.

When producing a gear made of a metal by cutting a metal material, such a partial shrink phenomenon, of course, does not occur. Such a partial shrink phenomenon may occur only in a case that a pair of ribs 28A and 29B are symmetrically formed on the front and rear side surfaces of the web 28. The eccentricity of a gear periphery of the conventional plastic gear that includes six pairs of ribs 29A and 29B respectively formed on the front and rear side surfaces 28A and 28B of the web 28 is illustrated in FIG. 14. As there seen, the gear diameter changes six times corresponding to the number of the ribs. As a result, the rotational speed of the plastic gear varies six times; thereby unevenness of the rotational speed arises when the conventional plastic gear rotates.

A possible cause of the change in rotational speed of the plastic gear is explained below. A portion of the gear ring 27 and gear teeth 26A, 26B and 26C each mounted on the circumference of the gear ring 27 are typically illustrated in FIG. 15. As there shown, ends of the ribs 29A and 29B are connected to the same portion (shown enlarged for ease of illustration) of the gear ring 27 between the teeth 26B and 26C. The portion of the gear ring 27 between the teeth 26B and 26C is more indented toward a rotational center of the plastic gear than other portions thereof, since the partial shrink occurs when the plastic gear is molded. Thus, the tooth 29A positioning at a left side of the ribs 29A and 29B inclines to the right and the tooth 29B positioning at a right side of the ribs 29A and 29B inclines to the left as illustrated in FIG. 15.

A gear tooth 26D of another gear meshes with the plastic gear 14 as illustrated in FIG. 15. If a pressure angle at a gear connecting portion at which the gear tooth 26D meshes with the gear tooth 26A is $\alpha_0$, a pressure angle $\alpha_1$ of the gear tooth 26B inclining on the right is larger then $\alpha_0$. A pressure angle $\alpha_2$ of the gear tooth 26C inclining on the left is smaller than $\alpha_0$.

If angular velocities are $\omega_0$, $\omega_1$ and $\omega_2$ correspond to gear portions having the angles of $\alpha_0$, $\alpha_1$, and $\alpha_2$, then the larger the pressure angle, the smaller the angular velocity and the smaller the pressure angle, the larger the angular velocity. Thus, the following relation is established around the ribs 29A and 29B:

$$\omega_1 < \omega_0 < \omega_2$$

Thus, when ribs 29A and 29B extend in a radial state, for example, from the rotational center of the gear and are each disposed in the same angular interval, a rotational speed of the gear periodically varies when the plastic gear rotates.

Further, a rotational speed of the conventional driving motor 10 generally varies once per one revolution thereof. Thus, a rotational velocity of the PC drum 1 remarkably changes at a prescribed timing, if a frequency of a change in rotational speed of the conventional driving motor 10 is almost coincident with that of the plastic gear 14. This is because cyclical peaks due to the change in rotational speed of the driving motor 10 and that due to the plastic gear 14 coincide with each other. As a result, unevenness of a toner image (so called "jitter") arises on the surface of the PC drum 1, and the image quality is inferior.

For example, if the driving motor 10 rotates at 1,800 rpm, a frequency of a change in rotational speed is 30 Hz (obtained by dividing 1,800 rpm by 60 second). If the number of teeth of the output gear 13 of the driving motor 10 is ten, a number of teeth of a plastic gear 14 that meshes with the output gear is seventy, and a number of ribs 28A and 28B mounted on each of the surfaces of the web 28 of the plastic gear 14 is seven, a frequency of a change in rotational speed of the gear 14 becomes 30 Hz, as obtained by the following formula:

$$1800 \text{ rpm} \times (10/70) \times (1/60 \text{ sec}) \times 7 = 30 \text{ Hz}$$

Thus, if the peaks of the above-mentioned cycles accord with each other, the change in rotational speed of the PC drum 1 becomes remarkably large, since the change in rotational speed of the driving motor is added to that of the plastic gear 14. Thus, the above-mentioned plastic gear may not be used for the transmission device.

Further, a plastic gear may be produced using an injection molding method. In such a method, if a new plastic gear that has a larger or smaller number of ribs than the plastic gear previously used is to be molded using the same mold, the mold is required to be remodeled to produce a different number of the ribs. However, it generally takes a huge cost, if remodeling the mold that has produced the previous model of the plastic gear, for example by changing a plastic injection gate through which molten plastic is poured.

SUMMARY OF THE INVENTION

An object of the present invention is therefore to address and resolve the aboveidentified and other problems and provide a new plastic gear.

According to the invention, the above and other objects are achieved by a plastic gear including a hub disposed at a core portion, a concentric gear ring disposed outside of the hub and having a plurality of gear teeth on its outer surface, a web that connects the hub with the gear ring, and at least one rib formed on both a front and a rear side surface of the web. The ribs extend from the hub toward the gear ring in such a manner that the rib formed on the front side surface is shifted by a prescribed angle from the rib formed on the rear side surface in a rotational direction.

The plastic gear can include a pair of a plurality of ribs each formed both on front and rear side surfaces of the web at the same angular intervals. The plurality of ribs can be formed both on the front and rear side surfaces in a radial state. The plurality of ribs formed on the rear side surface can be located at substantially a middle angular position of an angle defined by a pair of neighboring ribs formed on a front side surface. A rib can have different heights along its lengthwise direction.

DETAILED DESCRIPTION OF THE PREFERRED EMBODIMENTS

Figure 1:
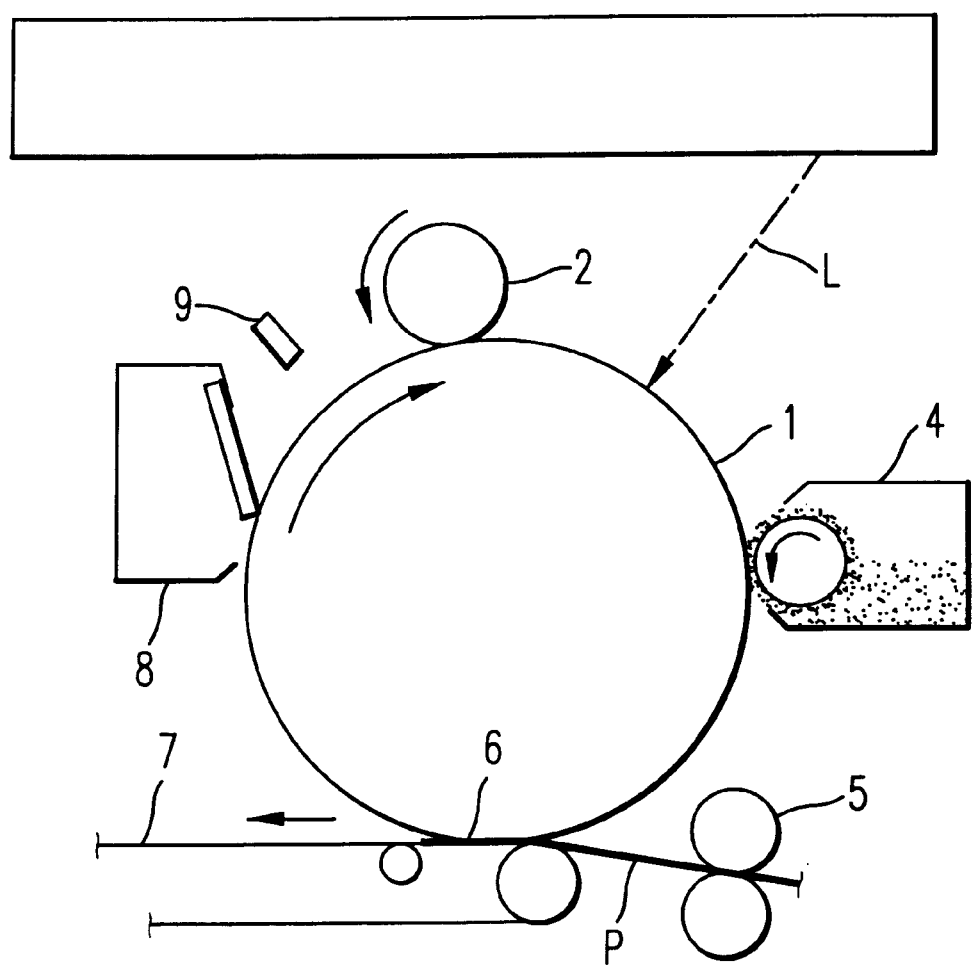
FIG. 1 is a schematic sectional view that illustrates an image forming apparatus to which a plastic gear of one embodiment of the present invention is to be applied.

Hereinbelow, embodiments of the present invention is explained in detail, referring to the drawings. Like numbers and marks indicate identical or correspond parts throughout the several views. An image forming apparatus to which a plastic gear of the present invention is to be applied is illustrated in FIG. 1.

A laser printer is illustrated in FIG. 1 as one of example of the image forming apparatus. The laser printer includes a photo-conductive drum 1 (hereinafter referred to as a PC drum 1) supported by a frame of the laser printer body to freely rotate, which is driven in a clockwise direction by a transmission device explained later in detail. A discharge roller 2 is disposed in contact with a surface of the PC drum 1. It rotates in counter-clockwise direction and applies charge having a prescribed polarity to the surface thereof. An optical writing device 3 is provided so as to generate a laser light beam L. The laser light beam is optically modulated and radiated to the surface of the PC drum 1, thereby forming a prescribed latent image thereon. A developing apparatus 4 is provided so as to develop the latent image when it passes through the developing station.

A sheet cassette, not shown, accommodates a plurality of printing sheets P. The printing sheets P fed from the cassette are transferred to a transfer position 6 to receive a toner image. A transfer belt 7 disposed below the PC drum 1 in pressure contact with the surface of the PC drum 1 at the transfer position is rotated in a predetermined direction. An electric field is created between the transfer belt and the PC drum 1 at the transfer position so that a transfer bias voltage that renders a toner transfer easy is applied therebetween. Thus, the toner image on the surface of the PC drum 1 is transferred onto the printing sheet due to the bias voltage.

A fixing device, not shown, is provided downstream of the transfer station. The toner on the printing sheet P is permanently fixed on the printing sheet P by the fixing device when it passes through the same. The printing sheet P is then ejected to the outside of the image forming apparatus and stacked on a sheet receiving tray, not shown. A cleaning device 8 is employed so as to clean the surface of the PC drum 1 by removing a residual toner remaining on the surface thereof after the toner transfer is completed. A discharge lamp may be provided so as to discharge the surface using a light beam.

Figure 2:
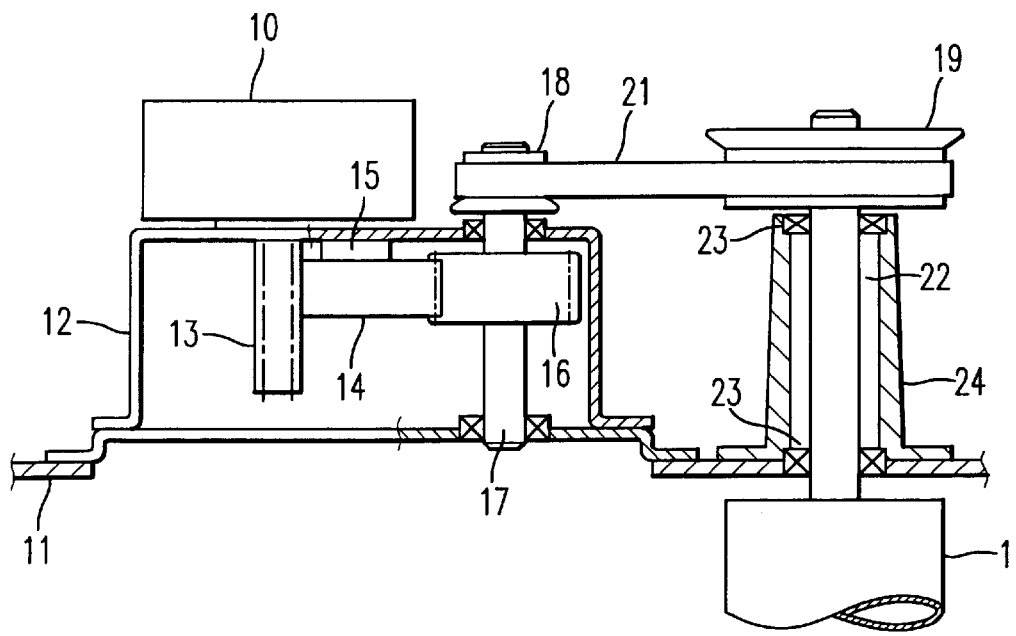
FIG. 2 is a plan view including a partial cross sectional view that illustrates a transmission device of the image forming apparatus illustrated in FIG. 1, which employs a plastic gear.
Figure 3:
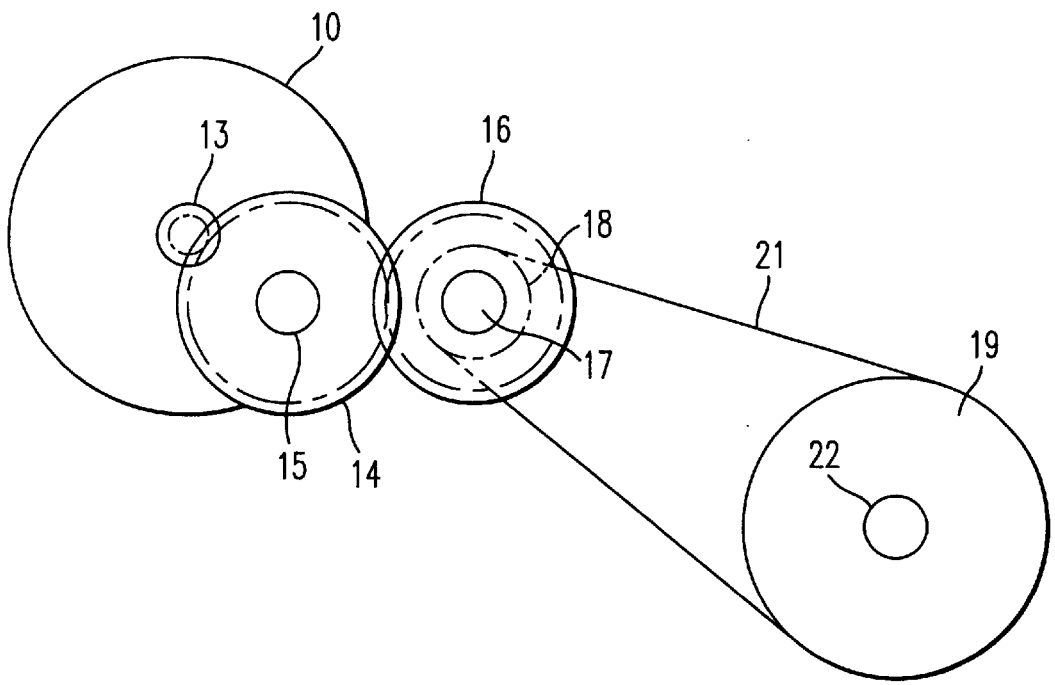
FIG. 3 is a front side view that illustrates the transmission device illustrated in FIG. 2.

One example of combinations of a driving motor 10 and a transmission device that transmits a rotational force from the driving motor 10 to driven member is illustrated in partial sectional plan view in FIG. 2, and in a front view in FIG. 3. The driving motor 10 is fixedly supported on a bracket 12 secured by the frame 11. An output gear 13 is connected to an output shaft of the driving motor 10, with which meshes a first gear 14 made of plastic. The first gear 14 is freely rotatably supported by a shaft 15 which is secured by the bracket 12. The first gear 14 meshes with a second gear 16 made of plastic. The second gear 16 is freely rotatably secured to a rotating shaft 17, which is freely rotatably supported by the bracket 12 through a bearing. A timing pulley 18 concentric with the second gear 16 is secured to one end of the shaft 17. Another timing pulley 19 is secured to a support shaft 22 that secures and supports the PC drum 1 therearound.

An endless timing belt 21 is wound around both the timing pulleys 18 and 19. The PC drum 1, the support shaft 22 and the timing pulley 19 are all concentric. An end of the support shaft 22 is rotatably supported by a PC drum holder 24 that is secured to the frame 11 of the laser printer body. The frame 11 also rotatably supports another end, not shown, of the support shaft 22.

When the driving motor 10 starts its rotation and accordingly the output gear 13 also rotates, a rotation force is transmitted to the timing pulley 18 through the first and second gears 14 and 16. The rotation force is transmitted to the PC drum 1 through the timing belt 21, the timing pulley 19 and the supporting shaft 22, thereby rotating the PC drum 1 clockwise when seeing FIG. 1.

The output gear 13 may be made of a metal based upon standard S45C. Both the first and the second gear 14 and 16 may be molded articles made of plastic as mentioned earlier. The PC drum 1 may be driven by the driving motor through the gears 14 and 16. The transmission device may have one or more than three plastic gears.

Since each of the plastic gears 14 and 16 has a same constitution, the typical plastic gear 14 is hereinafter explained. As illustrated in FIGS. 4 through 7, the plastic gear includes a cylindrical hub 25 which is disposed at a core portion thereof and is supported by the shaft 15 as illustrated in FIG. 2. The plastic gear 14 further includes an external gear ring 27 which is substantially concentric with the hub 24 and has a larger diameter than the hub 24. The gear ring 27 includes a plurality of gear teeth 26 on its outer circumferential surface.

The plastic gear 14 further includes a web 28 constituted by a circular plate whose edges integrally connect the hub 24 with the gear ring 27. An injection type plastic molding device may be used to mold the plastic gear 14. A plurality of ribs 28A and 28B are integrally formed respectively on front and rear sides of the web 28. The second gear is molded in a same manner.

Figure 4:
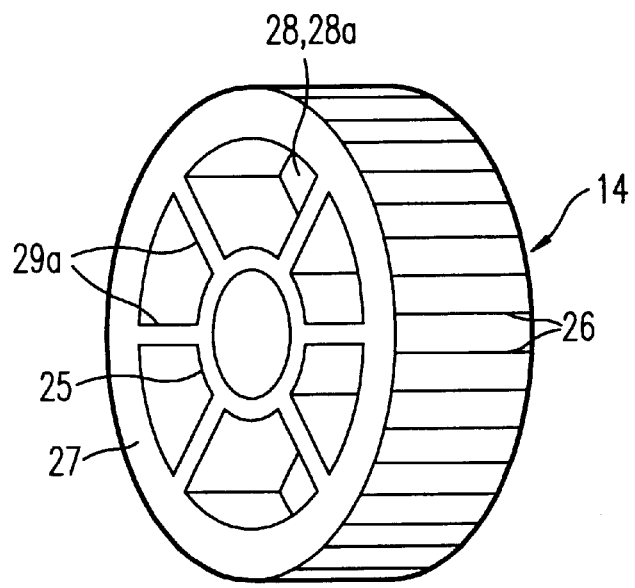
FIG. 4 is a perspective view that illustrates one example of a plastic gears to be used in the transmission device illustrated in FIG. 3.
Figure 5:
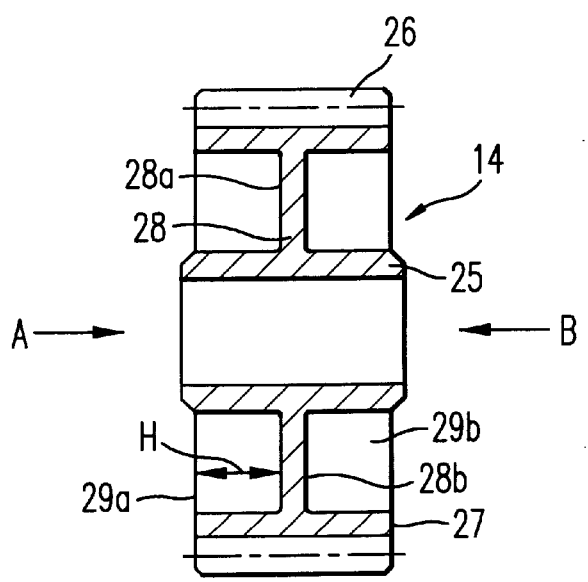
FIG. 5 is a vertical cross sectional view of the plastic gear illustrated in FIG. 4.
Figure 6:
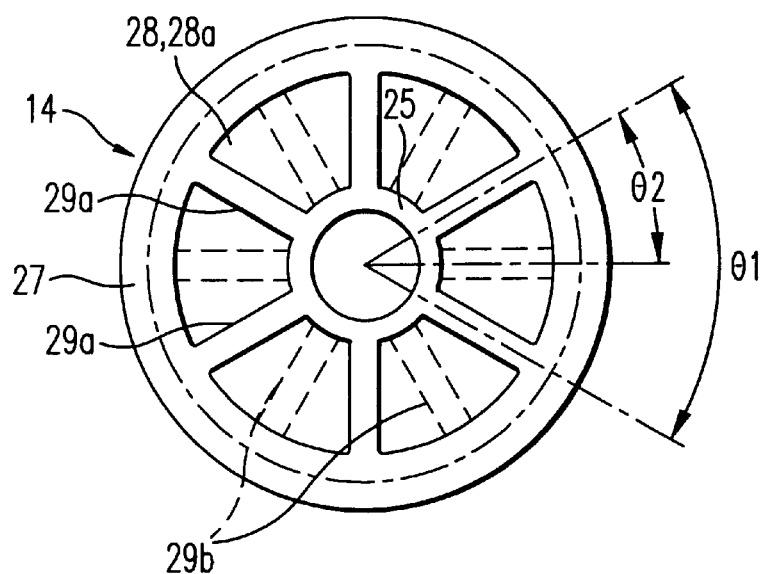
FIG. 6 illustrates a front side view of the plastic gear illustrated in FIG. 5 when viewed from a direction shown by an arrow A illustrated n FIG. 5.
Figure 7:
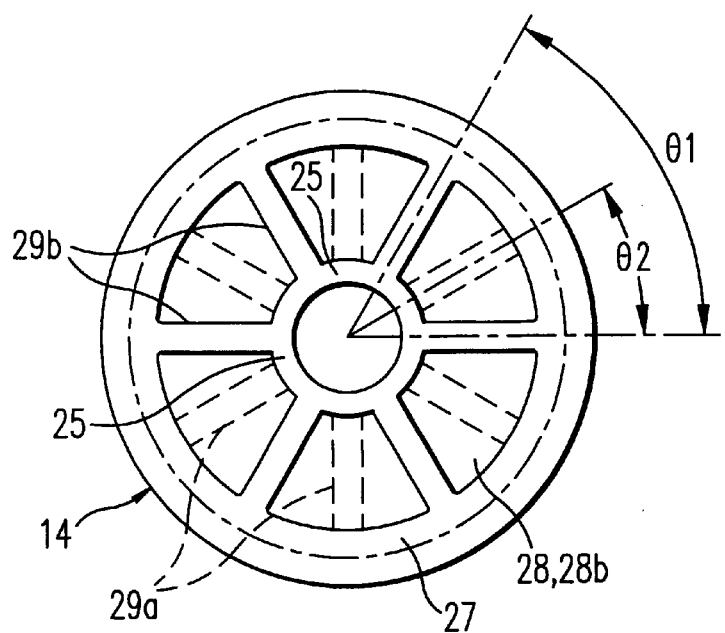
FIG. 7 illustrates a front side view of the plastic gear illustrated in FIG. 5 when viewed from a direction shown by an arrow B illustrated in FIG. 5.
Figure 8:
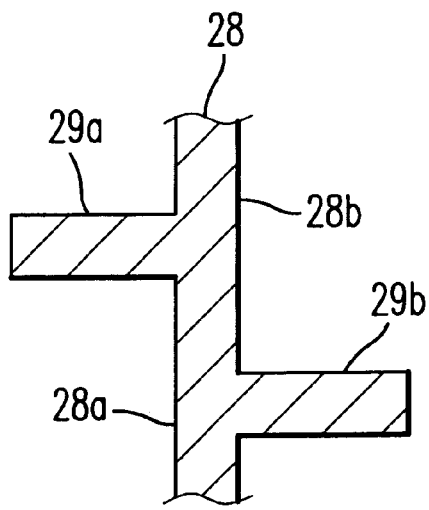
FIG. 8 is a cross sectional view that illustrates a positional relation between a first rib formed on a front surface and a second rib formed on a rear surface of a web of the plastic gear illustrated in FIGS. 4 through 7.

Referring to FIGS. 4 though 7, each of rib groups 29A and 29B is formed on the sides of the web 28 in a manner such that each rib extends radially from the hub 25 toward the gear ring 27 at a prescribed angular interval around the hub 25. Each of the ribs 29A is angularly shifted from each of the ribs 29B arranged on the back side of the web 28. Thus, ribs 29A and 29B are not symmetrically disposed on the side surfaces of the plastic gear 14.

FIGS. 4 through 7 show six ribs formed on each of the side surfaces of the web 28 of the plastic gear 14. The angular spacings $\theta_1$ of the ribs 29A and 29B is therefore 60° (obtained by dividing 360 degree by 6). Each of the ribs 29B formed on the rear side of the web 28 is located at a position that corresponds to about a middle angular position between neighboring ribs 29A formed on the front side of the web 28. Thus, each of the ribs 29A is shifted by about 30° ($\theta_2$) from each of the ribs 29B. The number of ribs 29A and 29B can be optionally determined. At least one rib can be utilized on a surface of a web 28 for a purpose of increasing the rigidity of the plastic gear 14. If twelve ribs are employed, $\theta_1$ is 30° and $\theta_2$ is 15°.

Figure 12:
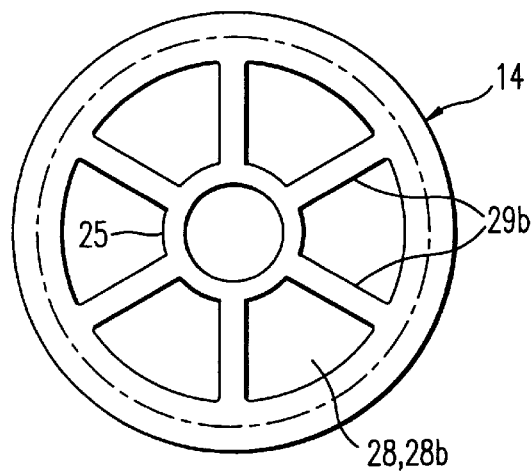
FIG. 12 is a rear side view of the conventional plastic gear illustrated in FIG. 10 when viewed from a direction shown by an arrow B1 illustrated in FIG. 10.
Figure 13:
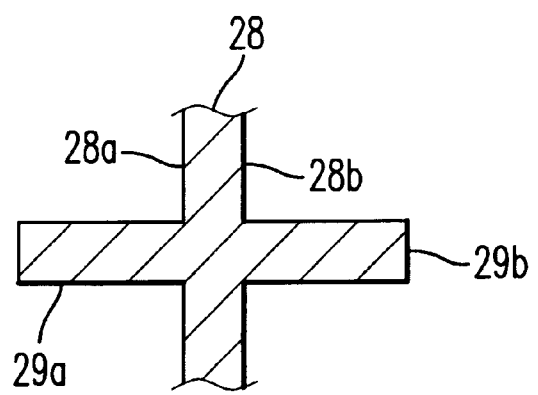
FIG. 13 is a cross sectional view that illustrates a positional relation between a first rib formed on the front surface and a second rib formed on the rear surface of a web of the conventional plastic gear illustrated in FIGS. 10 through 12.
Figure 14:
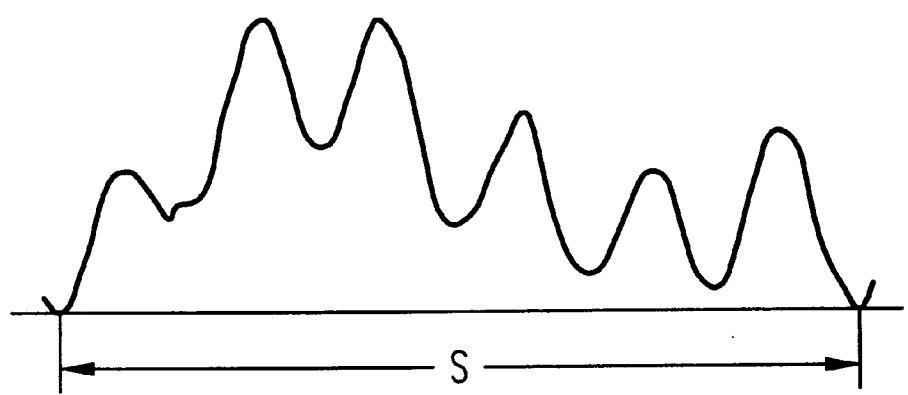
FIG. 14 is a graph obtained from a meshing test, which illustrates an eccentricity of the conventional plastic gear during one revolution thereof.
Figure 15:
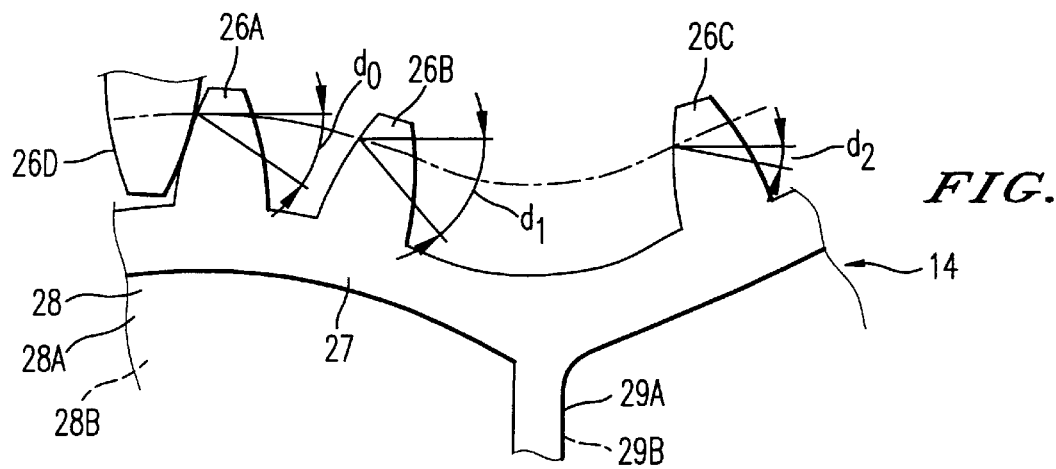
FIG. 15 is a partial cross sectional view of the conventional plastic gear, which explains a problem of the conventional plastic gear.

Thus, as illustrated in FIG. 13, the section through the web 28 does not intersects the sections of both the ribs 29A and 29B, since the ribs 29A and 29B are shifted by a prescribed angle in a rotational direction of the plastic gear 14. The section of the web 28 and a section of one of the webs 28A or 28B intersect each other to form almost a T letter shape. Thus, a smaller amount of partial shrink occurs at portions of the web 28 in which only one rib is formed than portions in which both the ribs 29A and 29B are symmetrically formed when the plastic gear 14 is molded. As a result, the amount of indention of the gear ring 27 toward the rotational center of the plastic gear 14 is reduced, and accordingly a decrease in diameter of portions in which the rib is formed may be also suppressed. Thus, the diameter of the plastic gear 14 of the present invention illustrated in FIGS. 4 through 7 is more even than that of the plastic gear 14 illustrated in FIGS. 10 through 12.

Figure 10:
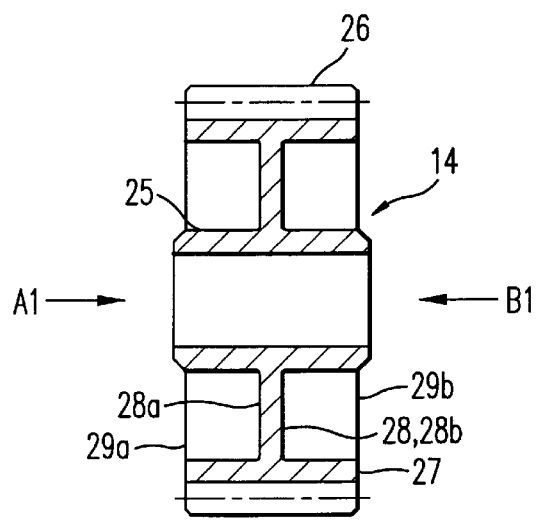
FIG. 10 is a vertical cross sectional view that illustrates a conventional plastic gear having a plurality of ribs symmetrically formed on a front and rear surfaces of the web.
Figure 11:
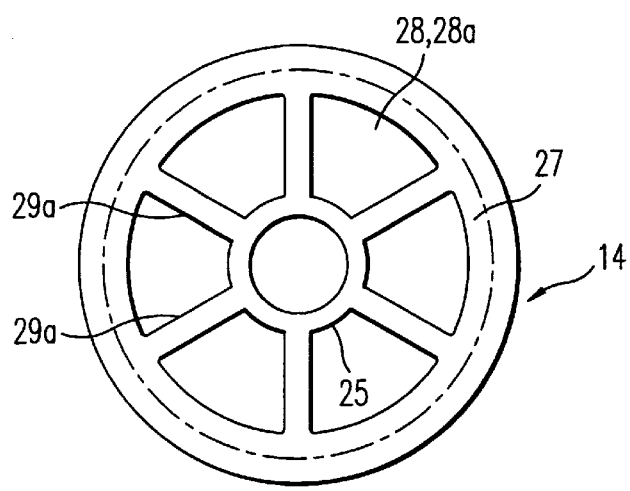
FIG. 11 is a front side view of the conventional plastic gear illustrated in FIG. 10 when viewed from a direction shown by an arrow A1 illustrated in FIG. 10.

Since each of the ribs 29A is shifted from each of the ribs 29B by an angle of 30° in a rotational direction of the plastic gear 14 as illustrated in FIGS. 4 through 7, the frequency of a change in rotational speed of the plastic gear 14 when it is rotated may be two times of that of the plastic gear 14 as illustrated in FIGS. 10 through 12 even if the same number of ribs is formed. Accordingly, an amount of change in rotational speed of the plastic gear 14 may be remarkably decreased.

Figure 9:
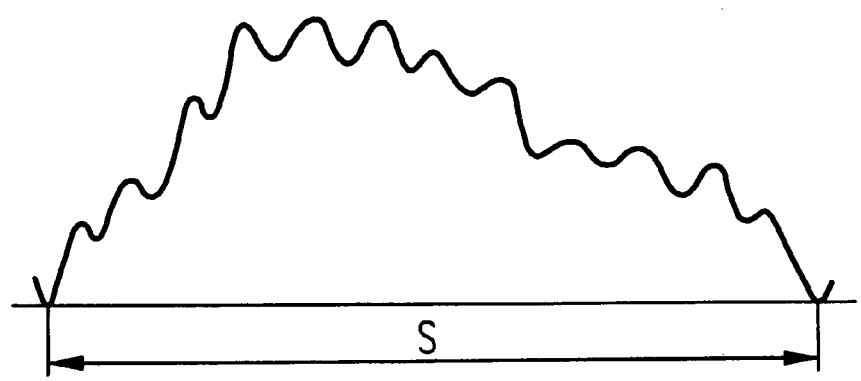
FIG. 9 is a graph obtained from a meshing test, which illustrates an eccentricity of a plastic gear of the present invention during one revolution thereof.

A result of a meshing test in which the plastic gear 14 of the present invention is meshed with a conventional gear is illustrated in FIG. 9. As there shown, a change in rotational speed which is caused by the partial shrink of the plastic gear 14 due to the indent of the portion of the gear ring 27 appears twelve times per revolution of the plastic gear 14. However, each of the twelve changes is relatively small. A gentle change in rotational speed appears one time during one revolution of the plastic gear 14 as illustrated in FIG. 9. However, it is not caused by molding of both the ribs 29A and 29B, but rather is an inherent result of manufacturing the plastic gear.

Since a plurality of ribs 29A and 29B is used on both sides of the web 28 in such a manner that each of the ribs is spaced from a neighboring rib by the same angle of $\theta_1$, and each of the ribs 29A is shifted by about a half of $\theta_1$ from each of the ribs 29B, a stable rotation of the plastic gear 14 may be obtained with less influence by a change in rotational speed. A frequency of a change in rotational speed caused by a partial shrink of the ribs is increased and uneven portions of the wave become smaller, and thereby the change in rotational speed is less noticeable. This advantage may be enhanced when the ribs 29A and 29B extend in a radial state from the hub 25 toward the gear ring 28.

If the number of ribs increases, the frequency of the plastic gear of the present invention may be higher than a frequency of a change in rotational speed, for example, 30 Hz, of the driving motor 10. Thus, a change in rotational speed of the PC drum 1 may be suppressed by avoiding a coincidence between each of the peaks and valleys of the cycles each created by the plastic gear 14 and the driving motor respectively.

Figure 16:
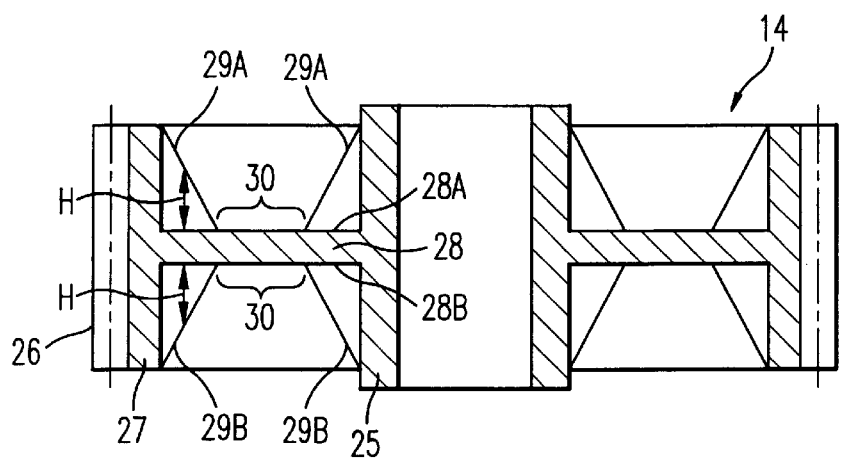
FIG. 16 is a cross sectional view that illustrates another embodiment of a plastic gear of the present invention, which has a rib having different heights along a length thereof.

The ribs may have the same height from the surface of the web 28 along their lengths. However, a rib that has a different height along its length may also be utilized. A slightly modified rib is hereinbelow explained in referring to FIG. 16. A height of the ribs may be higher around the hub portion and the gear ring portion, and lower, for example zero, at a middle portion thereof. A constitution of a plastic gear having the modified ribs may otherwise be same as mentioned earlier. These modified ribs may more efficiently avoid partial shrink than those previously described.

Figure 17:
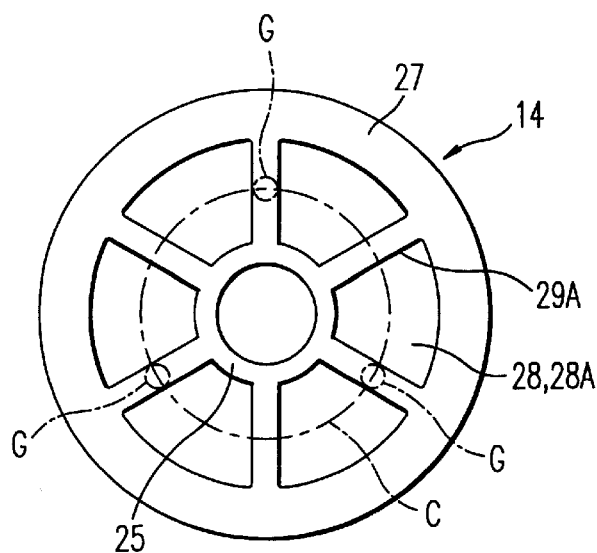
FIG. 17 is a chart that illustrates a relation between a gate of a mold, through which molten plastic is poured into an inside of the mold, and a plastic gear to be molded.
Figure 18:
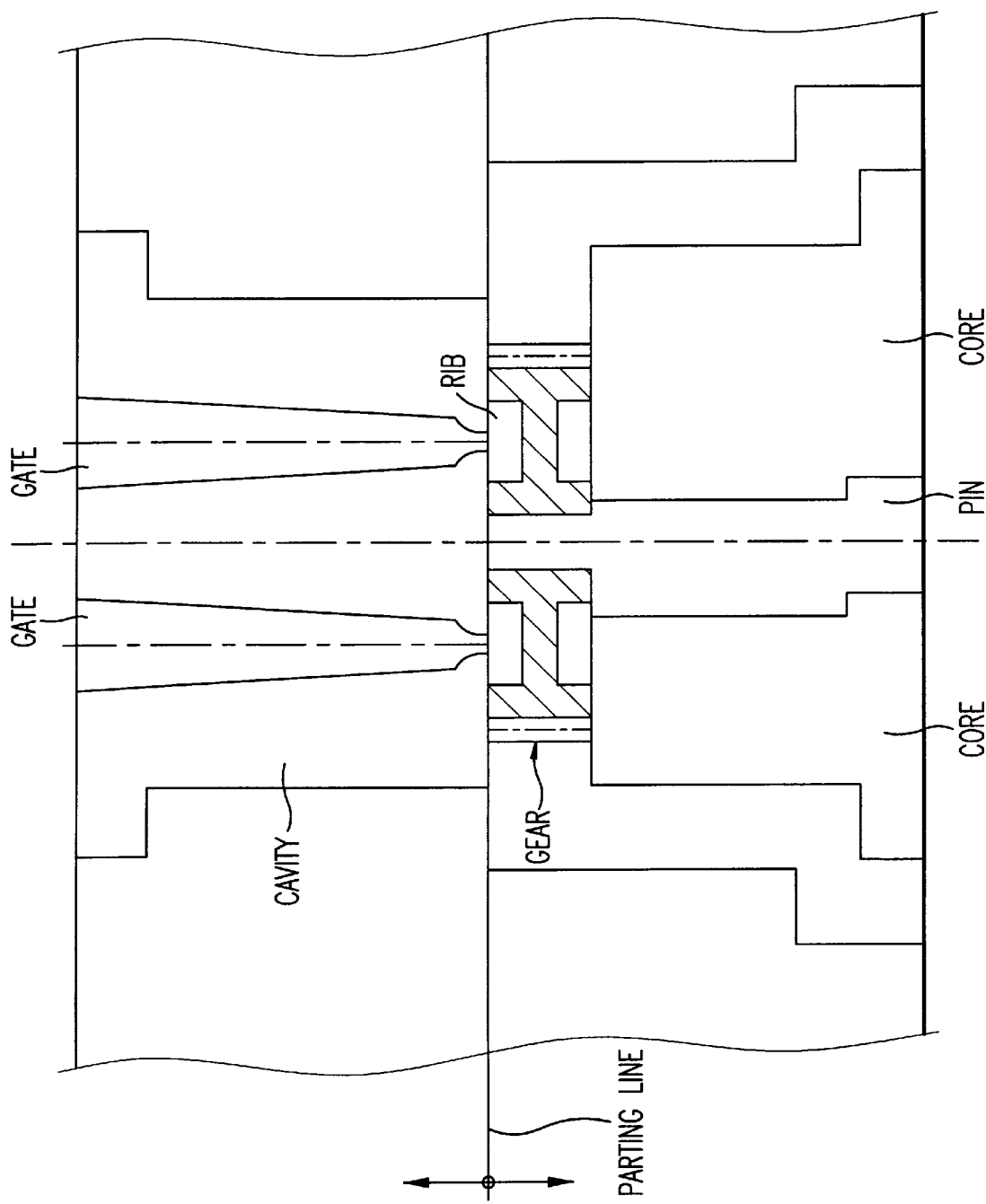
FIG. 18 is a cross sectional view that illustrates one example of molds used in the present invention.

Hereinbelow, another embodiment of the present invention is explained referring to FIGS. 17 and 18. Ribs 29A may be formed only on one side surface 28A of the web 28 of a plastic gear as illustrated in FIG. 17. Such a plastic gear 14 is generally molded by a mold illustrated in FIG. 18, using an injection molding method. A plurality, for example three, gates G having inlets may be employed at a same angular interval on a surface of the mold along a circle C illustrated by a dotted line in FIG. 17. A prescribed amount of molten plastic is generally poured into the mold through the gates G, thereby molding a plastic gear 14.

The number of ribs is preferably determined by considering the above-mentioned problem when an image forming apparatus is designed. During developing the image forming apparatus, a frequency of a change in rotational speed of the PC drum 1 sometimes changes, since a flywheel or the like is added to a transmission device thereof. As a result, the number of the ribs 29A is sometimes required to be changed to avoid the problem of a coincident of the peaks and valleys as mentioned above, and accordingly, the mold is required to be modified. However, it may be costly if a gate G is changed when a number of ribs is increased, for example.

In this embodiment, a number of a rib forming grooves provided in a portion of a cavity of the mold is selectively used to minimize the cost. When the number is to be determined, it is considered that each of the gates G is located on the circle C and above the rib-forming groove at a prescribed angular interval, and radially extending ribs are to be arranged at the same interval. If N is an integer more than two and represents a number of gates G, and n is an integer more than one, the number of grooves to be provided is determined as:

$$\text{Grooves} = N \cdot 2^{n-1}$$

After the number is determined, the prescribed grooves are provided on the portion of the cavity at a prescribed interval by cutting grooves at each of middle angular positions of neighboring grooves previously cut. Since a number of ribs may be changed without changing gates G initially used by slightly modifying a portion of cavity of the mold, it is not costly.

For example, if three gates are used as illustrated in FIG. 17, and a number n is determined as two, a mold including six grooves is manufactured by newly cutting three grooves and using the previously cut three grooves to obtain a plastic gear 14 having six ribs 29A. A frequency of thus molded plastic gear 14, when it rotates at 200 rpm, is:

200 rpm×6 pieces÷60 sec=20 Hz

When a frequency of a change in rotational speed of the PC drum 1, which is caused by the change in rotational speed of the driving motor 10, is changed from 30 hz to 20 Hz due to a modification of the transmission device, since the frequency of the PC drum 1 is almost coincident with a frequency caused by that of the ribs of the plastic gear 14, an amount of the change in rotational speed of the PC may expanded.

The above mentioned integral number n is then changed from two to three, to increase a number of ribs to twelve. Since a frequency of a change in rotational speed of thus molded gear 14 is obtained as 400 Hz (200 rpm×12 pieces÷60=40 Hz), it largely differs from the frequency of 20 Hz that is a level in which the rotational speed of the PC drum 1 largely changes. Since only the integral number n is changed while keeping the same number of gates G initially used, only a slight modification is made to the portion of the cavity of the mold and a cost for a modification of the mold may be suppressed.

Further, if a rotational speed of a processing device such as a discharge roller 2 and a transfer belt 7 is changed, since the processing device contacts the surface of the PC drum 1, a rotational speed of the PC drum 1 accordingly changes and thereby generates an uneven toner image thereon.

Thus, if at least one plastic gear 14 or 16 is used as a transmission device that transmits a rotational force to the discharge roller 2 and the transfer belt 7, a change in rotational speed of both the discharge roller 2 and the transfer belt 7, and accordingly, the PC drum 1 may be suppressed. Thereby, a quality of the toner image formed on the surface of the PC drum 1 may be improved. The above-mentioned plastic gear may be used at other locations besides the image forming apparatus.

Obviously, numerous additional modifications and variations of the present invention are possible in light of the teachings. It is therefore to be understood that within the scope of the appended claims, the present invention may be practiced otherwise than as specifically described herein. The present application is based on Japanese priority document 09-368853, the contents of which are incorporated herein by reference.

What is claimed is:

1. A plastic gear, comprising:

a hub;

a gear ring disposed around said hub, said gear ring having a plurality of gear teeth;

a web that connects said hub with said gear ring;

at least one first rib formed on a first side surface of said web, said first rib extending from said hub toward said gear ring; and at least one second rib formed on a second side surface of said web, said second rib extending from said hub toward said gear ring, wherein said at least one first rib formed on said first side surface is angularly shifted from said at least one second rib, whereby said at least one first rib is not angularly aligned with any second rib.

2. A plastic gear, comprising:

a hub;

a gear ring disposed around said hub, said gear ring having a plurality of gear teeth;

a web that connects said hub with said gear ring;

a plurality of substantially equally angularly spaced first ribs formed on a first side surface of said web; and a plurality of substantially equally angularly spaced second ribs formed on a second side surface of said web, wherein each of said second ribs is located at substantially a middle angular position between an adjacent pair of said first ribs.

3. A plastic gear as claimed in claim 2 wherein at least one of said ribs has different heights along its length.

4. A plastic gear, comprising:

a hub;

a gear ring disposed around said hub, said gear ring having a plurality of gear teeth;

a web that connects said hub with said gear ring;

at least one first rib formed on a first side surface of said web, said first rib extending, from said hub toward said gear ring; and at least one second rib formed on a second side surface of said web, said second rib extending from said hub toward said gear ring, wherein said at least one first rib formed on said first side surface is angularly shifted from said at least one second rib, wherein at least one of said ribs has different heights along its length.

5. A plastic gear, comprising:

a hub;

a gear ring disposed around said hub, said gear ring having a plurality of gear teeth;

a web that connects said hub with said gear ring;

a plurality of substantially equally angularly spaced first ribs formed on a first side surface of said web; and a plurality of substantially equally angularly spaced second ribs formed on a second side surface of said web, wherein at least one of said ribs has different heights along its length.

6. An image forming apparatus, comprising:

an image processing device which is rotatable to produce an image;

a driving motor that generates a rotational force; and a transmission device that transmits the rotational force from said driving motor to said image processing device, wherein said transmission device includes a plastic gear including:

a) a hub;

b) a gear ring disposed around said hub, said gear ring having a plurality of gear teeth;

c) a web that connects said hub with said gear ring;

d) at least one first rib formed on a first side surface of said web, said first rib extending from said hub toward said gear ring; and e) at least one second rib formed on a second side surface of said web, said second rib extending from said hub toward said gear ring, wherein said at least one first rib formed on said first side surface is angularly shifted from said at least one second rib, whereby said at least one first rib is not angularly aligned with any second rib.

7. An image forming apparatus, comprising:

an image processing device which is rotatable to produce an image;

a driving motor that generates a rotational force; and a transmission device that transmits the rotational force from said driving motor to said image processing device, wherein said transmission device includes a plastic gear including:

a) a hub;

b) a gear ring disposed around said hub, said gear ring having a plurality of gear teeth;

c) a web that connects said hub with said gear ring;

d) a plurality of substantially equally angularly spaced first ribs formed on a first side surface of said web; and e) a plurality of substantially equally angularly spaced second ribs formed on a second side surface of said web, wherein each of said second ribs is located at substantially a middle angular position between an adjacent pair of said first ribs.

8. A plastic gear as claimed in claim 7 wherein at least one of said ribs has different heights along its length.

9. An image forming apparatus, comprising:

an image processing device which is rotatable to produce an image;

a driving motor that generates a rotational force; and a transmission device that transmits the rotational force from said driving motor to said image processing device, wherein said transmission device includes a plastic gear including:

a) a hub;

b) a gear ring disposed around said hub, said gear ring having a plurality of gear teeth;

c) a web that connects said hub with said gear ring;

d) at least one first rib formed on a first side surface of said web, said first rib extending from said hub toward said gear ring; and e) at least one second rib formed on a second side surface of said web, said second rib extending from said hub toward said gear ring, wherein said at least one first rib formed on said first side surface is angularly shifted from said at least one second rib, wherein at least one of said ribs has different heights along its length.

10. An image forming apparatus, comprising:

an image processing device which is rotatable to produce an image;

a driving motor that generates a rotational force; and a transmission device that transmits the rotational force from said driving motor to said image processing device, wherein said transmission device includes a plastic gear including:

a) a hub;

b) a gear ring disposed around said hub, said gear ring having a plurality of gear teeth;

c) a web that connects said hub with said gear ring;

d) a plurality of substantially equally angularly spaced first ribs formed on a first side surface of said web; and e) a plurality of substantially equally angularly spaced second ribs formed on a second side surface of said web, wherein at least one of said ribs has different heights along its length.

* * * * *